US008904079B2

(12) United States Patent
Chang et al.

(10) Patent No.: US 8,904,079 B2
(45) Date of Patent: Dec. 2, 2014

(54) TUNNELING PLATFORM MANAGEMENT MESSAGES THROUGH INTER-PROCESSOR INTERCONNECTS

(75) Inventors: Luke Chang, Aloha, OR (US); Mahesh S. Natu, Sunnyvale, CA (US); James R. Vash, Littleton, MA (US); Michelle M. Sebot, Portland, OR (US); Robert J. Safranek, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 227 days.

(21) Appl. No.: 13/532,085

(22) Filed: Jun. 25, 2012

(65) Prior Publication Data

US 2013/0346666 A1    Dec. 26, 2013

(51) Int. Cl.
*G06F 13/20*    (2006.01)

(52) U.S. Cl.
CPC ..................................... *G06F 13/20* (2013.01)
USPC .......................................... 710/313; 710/315

(58) Field of Classification Search
USPC .......................................... 710/305, 313, 315
See application file for complete search history.

(56) References Cited

U.S. PATENT DOCUMENTS

| | | |
|---|---|---|
| 7,454,554 B1 | 11/2008 | Norrie et al. |
| 7,650,645 B1 | 1/2010 | Langendorf et al. |
| 7,779,275 B2 | 8/2010 | Thornton et al. |
| 7,886,335 B1 | 2/2011 | Chickering et al. |
| 7,971,261 B2 | 6/2011 | Pestoni |
| 8,103,810 B2 | 1/2012 | Brown et al. |
| 8,132,226 B1 | 3/2012 | Bianco et al. |
| 8,205,240 B2 | 6/2012 | Ansari et al. |
| 8,230,149 B1 | 7/2012 | Long et al. |
| 2006/0143716 A1 | 6/2006 | Ikemoto |
| 2006/0206655 A1 | 9/2006 | Chappell et al. |
| 2006/0259656 A1 | 11/2006 | Sullivan |

(Continued)

FOREIGN PATENT DOCUMENTS

| | | |
|---|---|---|
| TW | 201224839 A | 6/2012 |
| WO | 2012/024055 A2 | 2/2012 |

(Continued)

OTHER PUBLICATIONS

"Management Component Transport Protocol (MCTP) PCIe VDM Transport Binding Specification", DMTF Standard Specification, DSP0238, Version 1.0.1, Dec. 11, 2009, pp. 1-19.

(Continued)

*Primary Examiner* — Glenn A Auve
(74) *Attorney, Agent, or Firm* — Law Office of R. Alan Burnett, P.S.

(57) ABSTRACT

Methods and apparatus for tunneling platform management messages through inter-processor interconnects. Platform management messages are received from a management entity such as a management engine (ME) at a management component of a first processor targeted for a managed device operatively coupled to a second processor. Management message content is encapsulated in a tunnel message that is tunneled from the first processor to a second management component in the second processor via a socket-to-socket interconnect link between the processors. Once received at the second management component the encapsulated management message content is extracted and the original management message is recreated. The recreated management message is then used to manage the targeted device in a manner similar to if the ME was directly connected to the second processor. The disclosed techniques enable management of platform devices operatively coupled to processors in a multi-processor platform via a single management entity.

22 Claims, 9 Drawing Sheets

(56) References Cited

U.S. PATENT DOCUMENTS

| | | | |
|---|---|---|---|
| 2008/0195747 A1 | 8/2008 | Elmaliah | |
| 2008/0235363 A1 | 9/2008 | Shah | |
| 2009/0043941 A1 | 2/2009 | Brahmaroutu | |
| 2009/0069910 A1 | 3/2009 | Gabel et al. | |
| 2009/0083760 A1 | 3/2009 | Slaight | |
| 2009/0172240 A1* | 7/2009 | Slaight | 710/313 |
| 2009/0307719 A1 | 12/2009 | Clark et al. | |
| 2010/0215055 A1* | 8/2010 | Glaser | 370/469 |
| 2012/0047309 A1 | 2/2012 | Natu et al. | |
| 2012/0120959 A1* | 5/2012 | Krause | 370/392 |
| 2013/0205053 A1* | 8/2013 | Harriman et al. | 710/105 |

FOREIGN PATENT DOCUMENTS

| | | |
|---|---|---|
| WO | 2012/024055 A3 | 4/2012 |
| WO | 2014/004021 A2 | 1/2014 |
| WO | 2014/004021 A3 | 5/2014 |

OTHER PUBLICATIONS

International Search Report and Written Opinion received for PCT Patent Application No. PCT/US2011/045029, mailed on Feb. 9, 2012, 10 pages.

International Preliminary report on Patentability received for PCT Patent Application No. PCT/US2011/045029 mailed on Feb. 28, 2013, 8 pages.

Management Component Transport Protocol (MCTP) Host Interface Specification, DMTF Standard Specification, DSP0256, Version: 1.0.0, Jul. 21, 2010, pp. 1-19.

"Management Component Transport Protocol (MCTP) Base Specification", Version 1.1.0, Apr. 22, 2010, 82 pages.

"Management Component Transport Protocol (MCTP)", Tom Slaight, Intel Corporation, Dec. 3-6, 2007, 24 pages.

International Search Report and Written Opinion received for PCT Patent Application No. PCT/US2013/044500, mailed on Mar. 28, 2014, 10 pages.

* cited by examiner

| Field | Description |
|---|---|
| R or Fmt[2] | PCIe 1.1/2.0: PCIe reserved bit (1 bit). PCIe 2.1: Fmt[2]. Set to 0b. |
| Fmt | Format (2 bits). Set to 11b to indicate 4 dword header with data. |
| Type | Type and Routing (6 bits).<br>[4:3] Set to 10b to indicate a message<br>[2:0] PCI message routing (r2r1r0)<br>    000b : Route to Root Complex<br>    010b : Route by ID<br>    011b : Broadcast from Root Complex<br>Other routing fields values are not supported for MCTP. |
| R | PCIe reserved bits (1 bit). Refer to the PCI Express™ specification (PCIe). |
| TC | Traffic Class (3 bits). Set to 000b for all MCTP over PCIe VDM. |
| R or R \| Attr \| R \| TH | PCIe 1.1/2.0: PCIe reserved bits (4 bits).<br>PCIe 2.1: PCIe reserved bit (1 bit), Attr[2] (1 bit) – Set to 0b, reserved bit (1 bit), and TH (1 bit) – Set to 0b. |
| TD | TLP Digest (1 bit). Set to 0b for all MCTP over PCIe VDM. |
| EP | Error Present (1 bit). Set to 0b for all MCTP over PCIe VDM. |
| Attr | Attributes (2 bits). Set to 00b or 01b for all MCTP over PCIe VDM. |
| R or AT | PCIe 1.1: PCIe reserved bits (2 bits).<br>PCIe 2.0/2.1: Address Type (AT) field. Set to 00b. |
| Length | Length: Length of the PCIe VDM Data in dwords. Implementations shall support the baseline transmission unit defined in the MCTP Base Specification. For example, supporting a baseline transmission unit of 64 bytes requires supporting PCIe VDM data up to 16 dwords. An implementation may optionally support larger transfer unit sizes. |
| PCI Requester ID | Bus/device/function number of the managed endpoint sending the message. |
| Pad Len | Pad Length (2-bits). 1-based count (0 to 3) of the number of 0x00 pad bytes that have been added to the end of the packet to make the packet dword aligned with respect to PCIe. Because only packets with the EOM bit set to 1b are allowed to be less than the transfer unit size, packets that have the EOM bit set to 0b will already be dword aligned and will thus not require any pad bytes and will have a pad length of 00b. |
| MCTP VDM Code | Value that uniquely differentiates MCTP messages from other DMTF VDMs. Set to 0000b for this transport mapping as defined in this specification. |
| Message Code | (8 bits). Set to 0111_1111b to indicate a Type 1 VDM. |
| PCI Target ID | (16 bits). For Route By ID messages, this is the bus/device/function number that is the physical address of the target endpoint. This field is ignored for Broadcast and for Route to Root Complex messages. |
| Vendor ID | (16 bits). Set to 6836 (0x1AB4) for DMTF VDMs. The most significant byte is in byte 10, the least significant byte is byte 11. |
| Rsvd | MCTP reserved (4 bits). Set these bits to 0 when generating a message. Ignore them on incoming messages. |
| Hdr Version | MCTP version (4 bits)<br>0001b : For MCTP devices that conform to the MCTP Base Specification and this version of the PCIe VDM transport binding.<br>All other settings: Reserved to support future packet header field expansion or header version. |
| 0x00 PAD | Pad bytes. 0 to 3 bytes of 0x00 as required to fill out the overall PCIe VDM data to be an integral number of dwords. Because only packets with the EOM bit set to 1b are allowed to be less than the transfer unit size, packets that have the EOM bit set to 0b will already be dword aligned, and will thus not require any pad bytes and will have a pad length of 00b. |

*Fig. 5* (prior art)

TUNNELING PLATFORM MANAGEMENT MESSAGES THROUGH INTER-PROCESSOR INTERCONNECTS

TECHNICAL FIELD

The field of invention relates generally to management of computer systems and, more specifically but not exclusively relates to tunneling management messages between processors using inter-processor interconnects.

BACKGROUND ART

A typical server platform consists of multiple processor sockets, memory subsystem and a number of PCI Express controllers. The level of robust platform management is one of the key attributes that distinguishes a server from platform targeted for individual use, such as Personal Computers, laptops, notebooks, tablets, etc. The management of a server platform is typically orchestrated by the BMC (Baseboard Management Controller). The BMC allows the platform to be remotely managed through use of an application or web-based interface comprising a remote management console and uses a sideband path into the network controller to facilitate communications between the BMC and the remote management console. Since server management is a complex task, the BMC offloads some of the responsibilities to a Management Engine (ME). The ME is configured to perform various platform management tasks via communication with platform components over applicable interconnects, and communicates component operating parameters and associated data back to the BMC.

There are several manageability applications that require relatively high bandwidth (~10 MB/s), low latency communication paths between various components. Media redirection (mounting a remote drive) and Video redirection are two examples of such applications. In the current server platforms, a fast sideband bus such as RMII (Reduced Media Independent Interface) or an internal bus is used to meet these needs. A dedicated sideband bus increases component costs (more pins) and limits motherboard placement options. Internal busses limit mix and match configurations such as supporting media redirection using a discrete LAN or discrete graphics component.

Management Component Transport Protocol (MCTP) is a standard developed by Distributed Management Task Force (DMTF) for transporting manageability packets across various interconnects. "MCTP PCIe VDM Transport Binding Protocol" is a DMTF-authored specification that defines how MCTP packets may be sent over PCI Express (PCIe). MCTP over PCIe enables high bandwidth management traffic to be multiplexed over PCIe busses (i.e. interconnect fabric and/or PCIe links). Since most management components are already hooked up to one of these busses, this approach eliminates the need for a separate high bandwidth bus and enables more flexible arrangement of manageability components. Each of these components can be an "MCTP endpoint" and exchange messages over the existing fabric. When transported over PCIe, MCTP packets take the form of a Vendor Defined Message (VDM). In addition, MCTP or more generically PCI Express VDMs can be utilized for managing the processors themselves (e.g. processor thermals, power and errors).

Modern server platforms typically employ multiple processors and each processor may have MCTP over PCIe endpoints attached to it. However, in order to access the MCTP over PCIe endpoint using conventional techniques, there needs to be an ME associated with each processor. For example, a server platform employing four processors would require four ME's. Another issue with traditional management platform architectures is the BMC uses a Platform Environmental Control Interface (PECI) pin for managing processors. This works fine as long as there is only one management controller in the system and milliseconds access latency is acceptable. There are configurations where an ME needs access to processor instrumentation for Power Capping purposes. In addition, there are new emerging usages such as power/performance characterization which can benefit from 10-100 microseconds access latency.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 5 is a table containing a description of information in various fields of the MCTP message of FIG. 4;

DESCRIPTION OF THE EMBODIMENTS

Embodiments of methods and apparatus for tunneling platform management messages through inter-processor interconnects are described herein. In the following description, numerous specific details are set forth (such as use of PCIe and QPI) to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

In accordance with aspects of the embodiments disclosed herein, the foregoing deficiencies are addressed through a novel approach that enables a single ME or other management entity in a platform to be used to implement management operations of manageable devices in a multi-processor platform by tunneling platform management messages across inter-processor interconnects. In some embodiments, PCIe management packets are tunneled over socket-to-socket QPI interconnects. Intel® Corporation introduced the first version of the QuickPath Interconnect® (QPI) protocol and related architecture in 2009. QPI was initially implemented as a point-to-point processor interconnect replacing the Front Side Bus on platforms using high-performance processors, such as Intel® Xeon®, and Itanium® processors. QPI is scalable, and is particularly advantageous in systems having multiple processors employing shared memory resources. QPI transactions employ packet-based transfers using a multi-layer protocol architecture. Recently introduced platform architectures and corresponding processors include use of socket-to-socket QPI links, enabling high-bandwidth communication between entities on different processors over QPI links.

Figure 1:
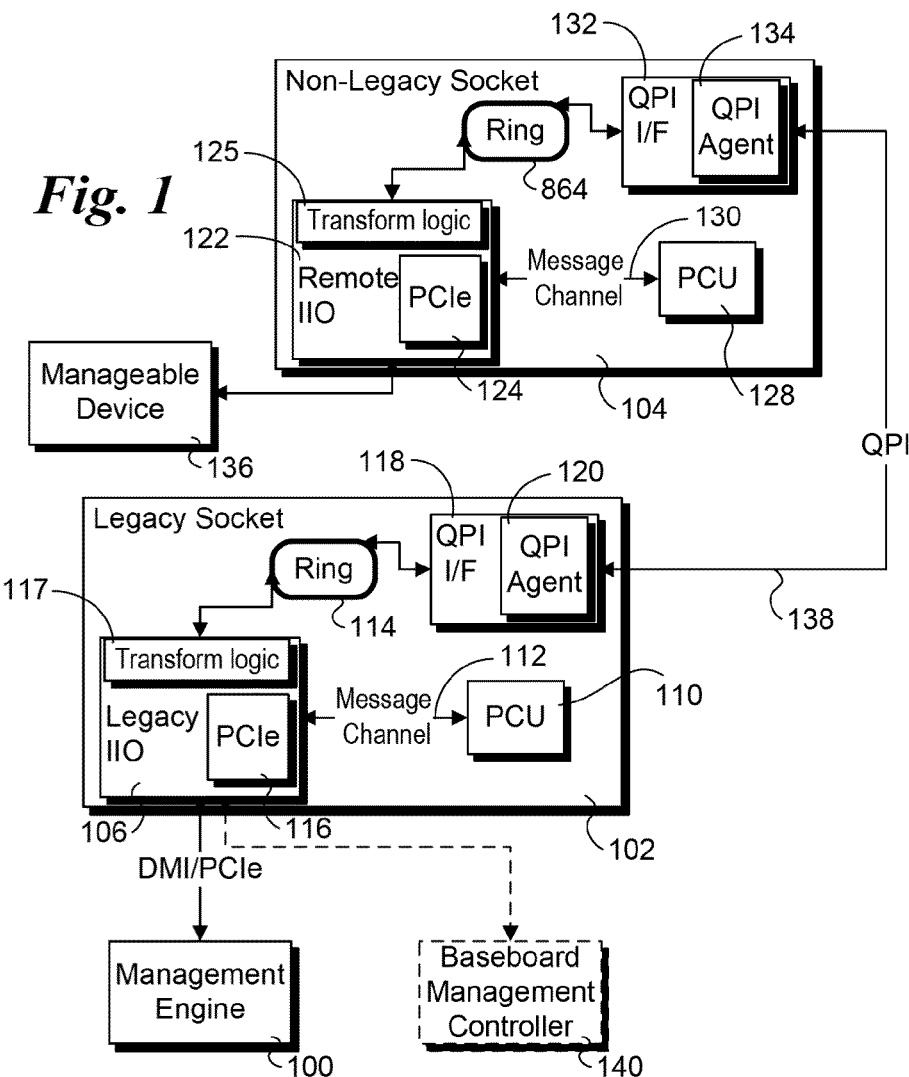
FIG. 1 is a high-level block diagram illustrating an overview of an architecture that enables a single management entity to perform management operations relating to devices accessed via multiple processors by tunneling management messages between processors over a QPI link.

FIG. 1 illustrates a high-level block diagram illustrating an overview of an exemplary implementation of the approach using a single management engine 100 to perform ME operations for two processors, depicted as a legacy socket 102 and a non-legacy socket 104. In server platforms employing multiple processors, the boot processor (that is, the processor used to perform system booting via loading of corresponding boot code and initialize various platform components) is referred to as a "legacy" socket, while other processors in the system are referred to as non-legacy sockets.

Legacy socket 102 includes a legacy Integrated Input-Output (IIO) block 106 coupled to ME 100 via a DMI (Direct Memory Interface) or PCIe link 108, coupled to a Power Control Unit 110 via a message channel 112, and coupled to a ring interconnect 114. Legacy IIO block 106 further includes a PCIe block 116 and transformation logic 117. Ring interconnect 114 is also connected to a QPI interface (I/F) 118 including a QPI agent 120.

Non-legacy socket 104 has a similar configuration to legacy socket 102, except that it employs a remote IIO block 122 rather than a legacy IIO block 106 and that it is not directly connected to ME 100. The other components of non-legacy socket 104 include a PCIe block 124, transformation logic 125, a ring interconnect 126, a PCU 128, a message channel 130, and a QPI interface 132 including a QPI agent 134.

Remote IIO block 122 is further depicted as being connected to a manageable device 136. As used herein, a "manageable" device corresponds to any platform device that may receive management messages relating to management operations performed by a management entity. Although shown as being directly connected to an IIO block, a manageable device may generally be operatively coupled to an IIO block via one or more connections. For example, in the context of PCIe, there may be several levels of hierarchy, with a PCIe end device located at a level in the hierarchy that is not directly connected to a PCIe interface or PCIe block in the IIO block.

FIG. 1 further shows a socket-to-socket QPI link 138, that is coupled between QPI interfaces 118 and 132. Support for socket-to-socket QPI links has been recently introduced, and, in connection with associated interfaces and protocols, enables components on different processors to communicate over a high-bandwidth interconnect.

In addition to employing a management engine, other management entities may be employed for performing platform management operations. For example, FIG. 1 further depicts a Baseboard Management Controller (BMC) 140 coupled to legacy IIO block 106. The use of dashed lines here indicates that this is an optional configuration.

In accordance with teachings disclosed herein, tunneling transformation logic in the IIO blocks in combination with the socket-to-socket QPI links and associated interfaces enable management of components and manageable device associated with multiple processors from a single ME or other management entity, such as a BMC. This functionality is facilitated, in part, through the use of PCIe management packets that are tunneled through QPI interconnects, as described in detail below. In order to better understand how PCIe management packets are tunneled through QPI, the following brief overview of QPI is provided.

Overview of QuickPath Interconnect

Figure 2:
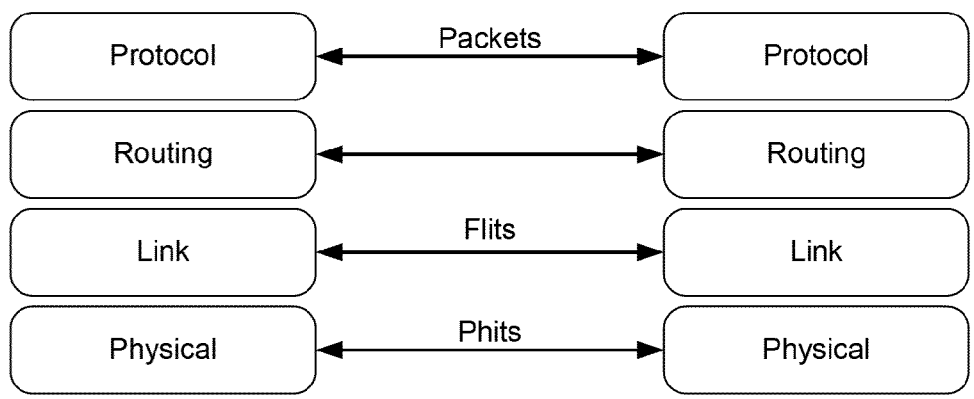
FIG. 2 shows the layers of the QPI protocol stack.

QPI transactions are facilitated via packetized messages transported over a multi-layer protocol. As shown in FIG. 2, the layers include a Physical layer, a Link layer, a Transport layer, and a Protocol layer. At the Physical layer, data is exchanged in 20-bit phits (Physical Units). At the link layer phits are aggregated into 80-bit flits (flow control units). At the Protocol layer, messages are transferred between agents using a packet-based transport.

Figure 3:
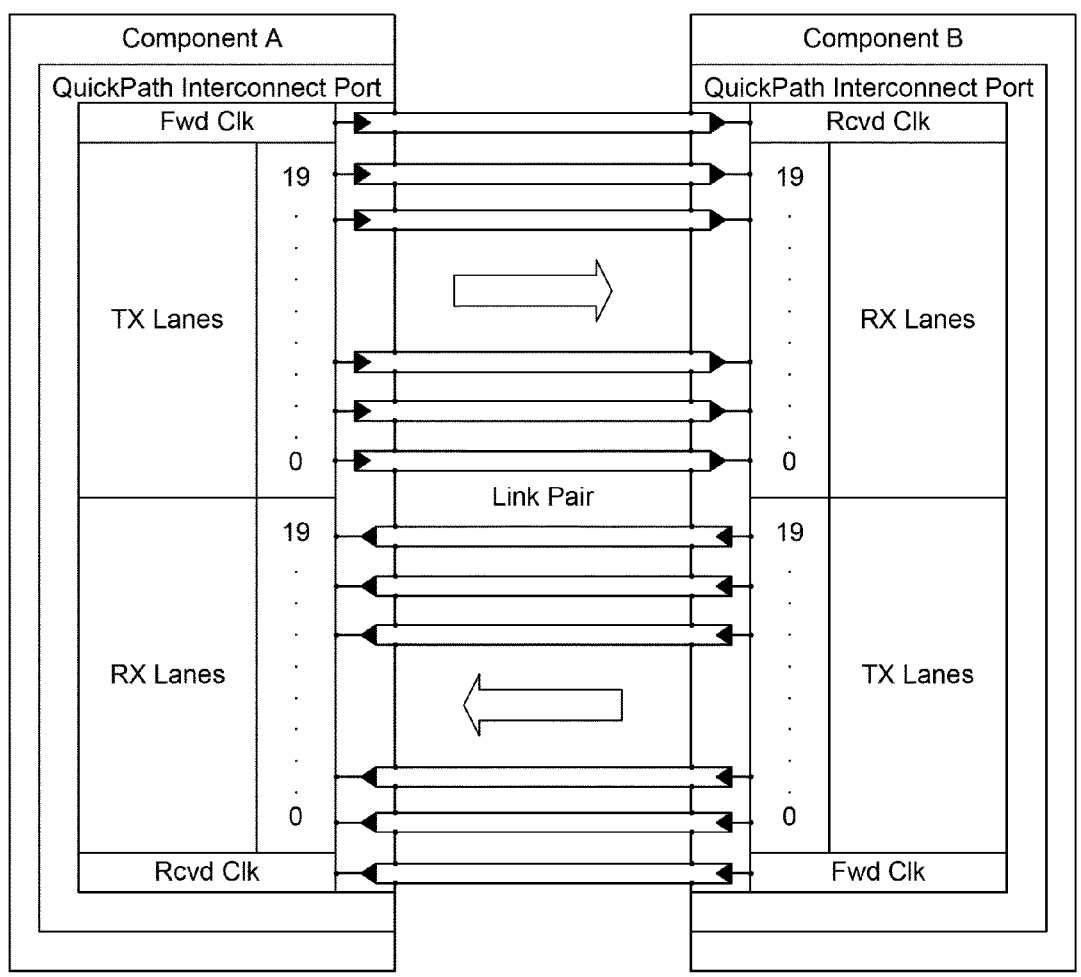
FIG. 3 is a schematic diagram illustrating the structure of a full-width QPI link.

The Physical layer defines the physical structure of the interconnect and is responsible for dealing with details of operation of the signals on a particular link between two agents. This layer manages data transfer on the signal wires, including electrical levels, timing aspects, and logical issues involved in sending and receiving each bit of information across the parallel lanes. As shown in FIG. 3, the physical connectivity of each interconnect link is made up of twenty differential signal pairs plus a differential forwarded clock. Each port supports a link pair consisting of two uni-directional links to complete the connection between two components. This supports traffic in both directions simultaneously.

Components with QPI ports communicate using a pair of uni-directional point-to-point links, defined as a link pair, as shown in FIG. 3. Each port comprises a Transmit (Tx) link interface and a Receive (Rx) link interface. For the illustrated example, Component A has a Tx port that is connected to Component B Rx port. One uni-directional link transmits from Component A to Component B, and the other link transmits from Component B to Component A. The "transmit" link and "receive" link is defined with respect to a specific QPI agent. The Component A transmit link transmits data from Component A Tx port to Component B Rx port. This same Component A transmit link is the Port B receive link.

The second layer up the protocol stack is the Link layer, which is responsible for reliable data transmission and flow control. The Link layer also provides virtualization of the physical channel into multiple virtual channels and message classes. After the Physical layer initialization and training is completed, its logical sub-block works under the direction of the link layer, which is responsible for flow control. From this link operational point onwards, the logical sub-block communicates with the Link layer at a flit granularity (80 bits) and transfers flits across the link at a phit granularity (20 bits). A flit is composed of integral number of phits, where a phit is defined as the number of bits transmitted in one unit interval (UI). For instance, a full-width QPI link transmits and receives a complete flit using four phits. Each flit includes 72 bits of payload and 8 bits of CRC.

The Routing layer is responsible for ensuring that messages are sent to their proper destinations, and provides the framework for directing packets through the interconnect fabric. If a message handed up from the Link layer is destined for an agent in another device, the Routing layer forwards it to the proper link to send it on. All messages destined for agents on the local device are passed up to the protocol layer.

The Protocol layer serves multiple functions. It manages cache coherence for the interface using a write-back protocol. It also has a set of rules for managing non-coherent messaging. Messages are transferred between agents at the Protocol level using packets. The Protocol layer manages delivery of messages across multiple links, involving multiple agents in multiple devices.

MCTP over PCIe

The Management Component Transport Protocol (MCTP) is a protocol defined by the DMTF Platform Management Component Intercommunications sub-team of the DMTF Pre-OS Workgroup. MCTP is designed to support communications between different intelligent hardware components that make up a platform management subsystem that is provides monitoring and control functions inside a managed system. MCTP is independent of the underlying physical bus properties, as well as the "data-link" layer messaging used on the bus. The physical and data-link layer methods for MCTP communication across a given medium are defined by companion "transport binding" specifications, such as MCTP over PCIe Vendor Defined Messaging (VDM) and MCTP over SMBus/$I^2C$. This approach enables future transport bindings to be defined to support additional buses such as USB, RMII, and others, without affecting the base MCTP specification. Various specifications relating to MCTP including the MCTP base specification and are published by DMTF and generally available at www.dmtf.org.

One implementation of MCTP is targeted for use over PCIe, and thus is referred to as MCTP over PCIe. Implementation details for MCTP over PCIe are defined by the Management Component Transport Protocol PCIe VDM Transport Binding Specification. This specification includes definitions for a packet format, physical address format, message routing, and discovery mechanisms for MCTP over PCIe VDM communications.

A processor architecture supporting MCTP over PCIe includes various facilities for routing of MCTP message packets in accordance with the MCTP base specification. The basic unit of data transfer in MCTP is the "MCTP packet." One or more MCTP packets are used to transfer an "MCTP message." The base MCPT protocol defines the common fields for MCTP packets and how they are used. This includes defining fields such as source and destination address fields, fields that identify which packets belong to a particular MCTP message, and fields that define what type of communication traffic is being carried in the MCTP message. The base protocol also defines the processes used for assembling MCTP messages, routing MCTP packets, and handling error conditions such as dropped or missing packets.

An MCTP endpoint is the function within a device that terminates the communication protocol of MCTP and handles MCTP Control commands. MCTP uses a logical address called the endpoint ID (EID) for addressing and routing MCTP packets to and from endpoints. In MCTP a bus is defined as an interconnect between platform components that share a common physical layer address space. A bus may be made up of multiple segments. A bus segment is a portion of a bus that is electrically separated from other segments that form a bus, but still shares a common physical address space with other segments.

Each MCTP bus has a bus owner. Bus Owners are responsible for assigning EIDs to any MCTP devices on that bus. A bus owner may also have additional media-specific responsibilities, such as device discovery and assignment of physical addresses. MCTP Bridges are devices that connect to two or more MCTP busses and are responsible for routing MCTP packets between those busses. A bridge will typically also be the bus owner for at least one of the busses to which it connects.

MCTP allows multiple bridges, busses, and bus owners to be interconnected to form an "MCTP network." Because bus owners are responsible for assigning EIDs to any devices that are on the bus that it owns, MCTP provides a mechanism that enables bus owners to be allocated a pool of endpoint IDs that can subsequently be assigned or allocated to other devices. The ultimate source of EIDs for the entire MCTP network comes from what is referred to as the "topmost bus owner."

MCTP packets are routed based on their EIDs. MCTP bridges maintain a set of information referred to as the "routing table" that tracks the relationship between the physical addresses and bus with which an EID is associated. When an incoming packet is received, this information is used to route the packet to the appropriate bus. If the source and target busses use different physical media the bridge is also responsible for translating the physical layer formatting of the packet as required by the target medium. The information in the routing table is also used for handling requests to resolve an EID into a physical address and to support a capability to query individual bridges and bus owners for their routing information. This latter capability provides a way to obtain a snapshot of the MCTP network's routing configuration. The MCTP bridging function forwards packets based on endpoint addressing information on a per packet basis. Otherwise, bridging does not interpret message content, or handle message type-specific protocol behavior for routed packets. Bridging does not do intermediate assembly or disassembly of routed packets. Message assembly and disassembly is handled solely by the destination and source endpoints, respectively.

The type of communication payload in an MCTP Message is identified by an enumeration called the "MCTP Message Type." MCTP is designed to be able to carry packets for multiple message types across a common communications medium. The MCTP base protocol specification includes definition of a message type for MCTP Control messages and message types that support Vendor-defined MCTP messages. Different message types are identified by a message type field that is carried in the header of an MCTP message.

The Transport Binding specifications are documents that describe how MCTP is implemented on a particular physical medium. This includes the definition of MCTP packet formatting for the medium, source and destination physical addressing handling, physical layer data integrity, and medium-specific timing parameters.

Figure 4:
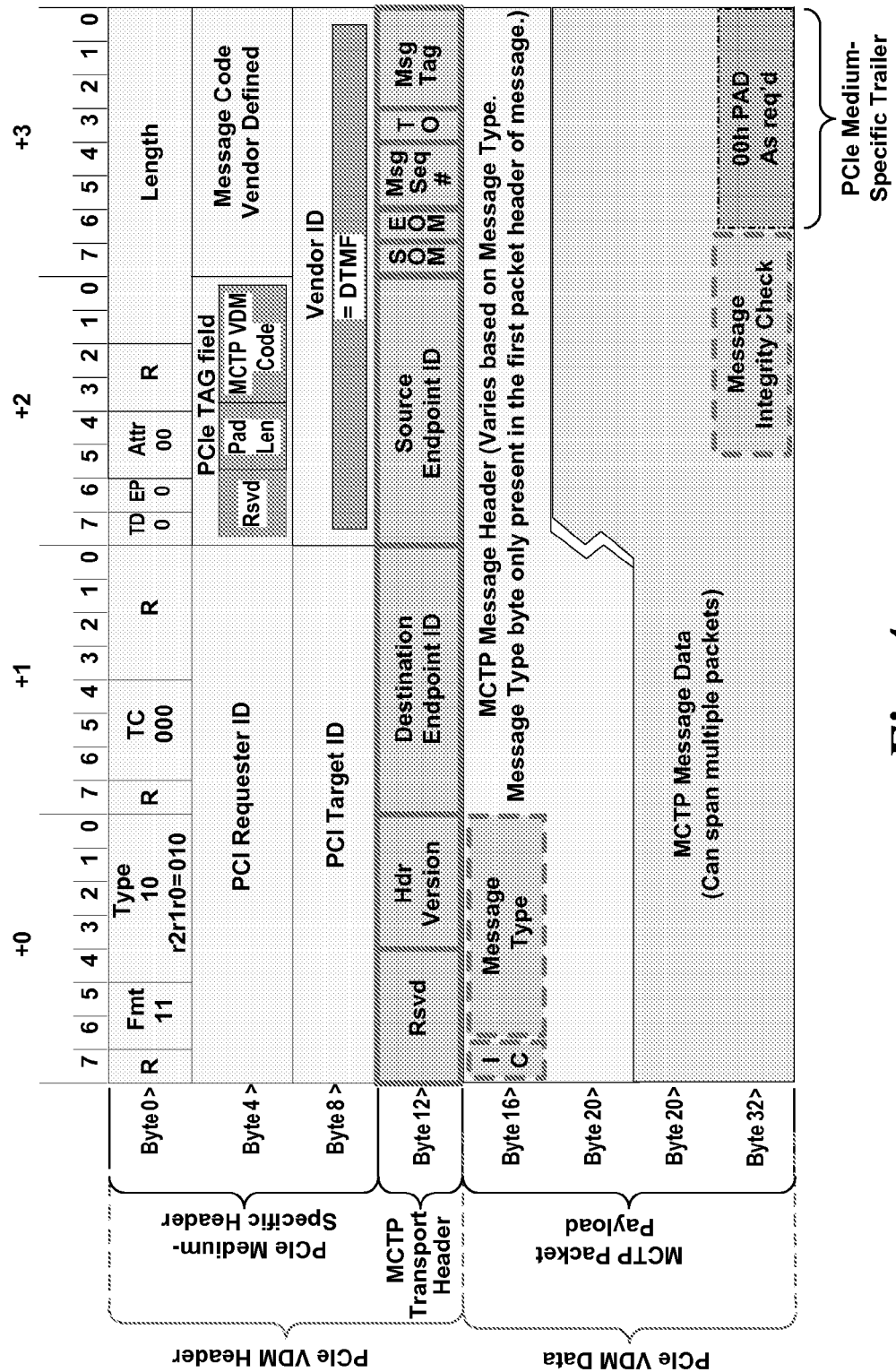
FIG. 4 shows a packet format for an MCTP message.

FIG. 4 shows an MCTP over PCIe packet format, according to one embodiment. The fields grouped by labels "PCIe Medium-Specific Header" and "PCIe Medium-Specific Trailer" are specific to carrying MCTP packets using PCIe VDMs. The fields grouped by labels "MCTP Transport Header" and "MCTP Packet Payload" are common fields for all MCTP packets and messages and are specified the MCTP Base Specification. Further descriptions for the MCTP over PCIe packet format are shown in FIG. 5.

The PCIe VDM header format is common for MCTP messages sent over PCIe. It includes various fields relating basic MCTP message structure, as well as fields in which vendor-specific information can be entered. As part of the basic routing requirements for routing MCTP messages over PCIe, these fields include a PCI Requester ID and a PCI Target ID. The PCI Request ID is the EID (i.e., logical address) of the PCI Requester, that is the PCIe entity from which a request (for an associated service) originates. The PCI Target ID corresponds to the EID of the PCIe entity for which the (request) message is targeted.

The MCTP packet payload begins at Byte 16 and can extend up to Byte 80, yielding a total payload of up to 64 bytes. This portion of the packet also corresponds to the PCIe VDM data. This particular packet configuration shows an example of a PECI message, as identified by the Vendor Define Message Type Code field. The message format also includes MCTP Message data in the MCTP Packet Payload including a Write Length (WL) byte, a Read Length (RL) byte, and an MCTP command.

Under the conventional approach, the PCIe VDM extension to MCTP enables various MCTP messages to be routed to targeted MCTP endpoints using PCIe wiring and protocols. However, as discussed above, this only works for MCTP endpoints that are on the same processor that an ME is connected to. This is a significant limitation for modern server platforms employing multiple processors.

This shortcoming is addressed by combining MCTP over PCIe messaging techniques with the QPI protocol and QPI interconnect structures to enable MCTP management message content to be tunneled between processors. Accordingly, from the perspective of an ME or other management entity, the platform MCTP endpoints simply appear within the same EID address space, regardless of what processor they are physically associated with.

Figure 6:
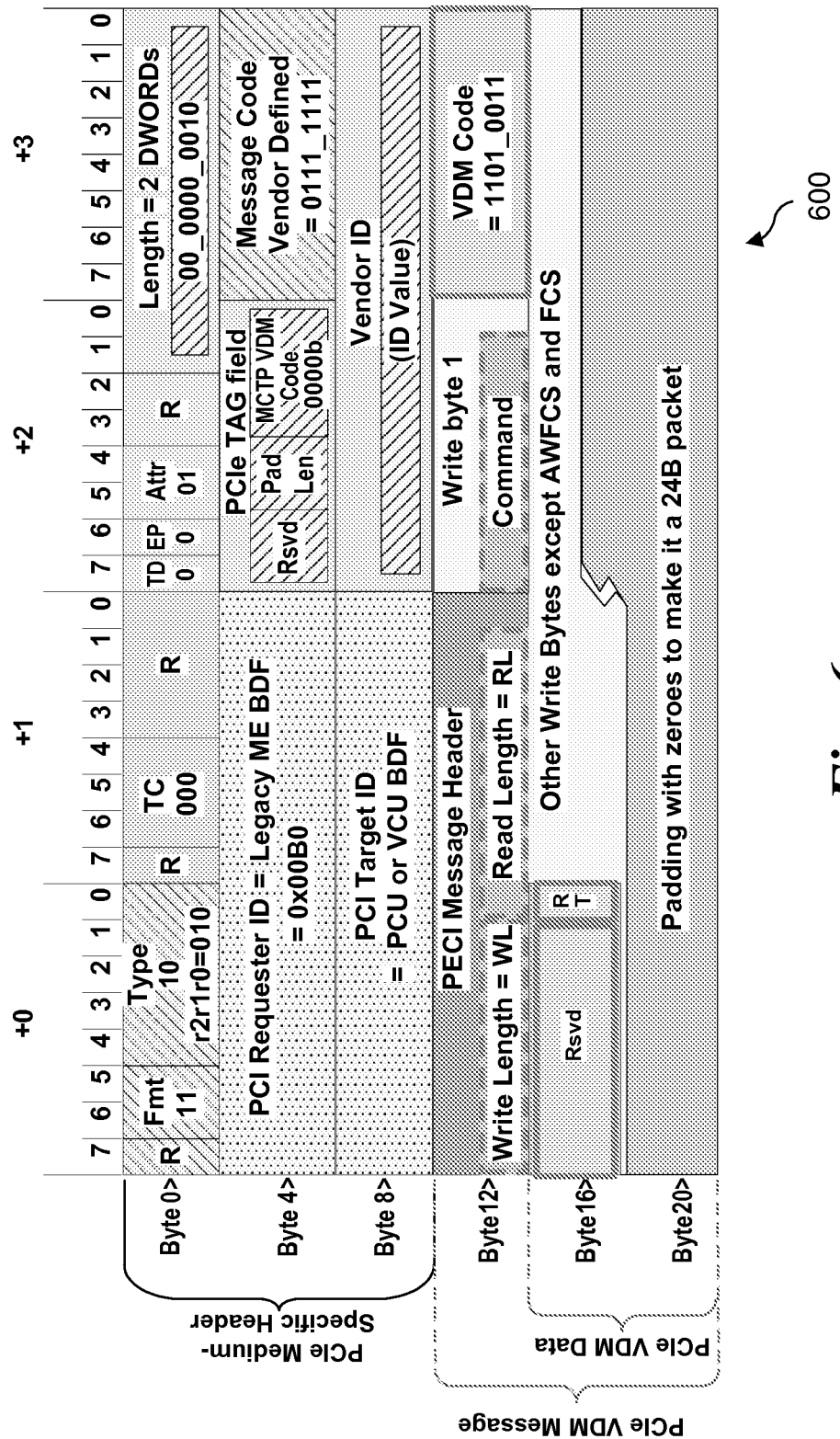
FIG. 6 shows a packet format corresponding to a PCIe VDM message.
Figure 7:
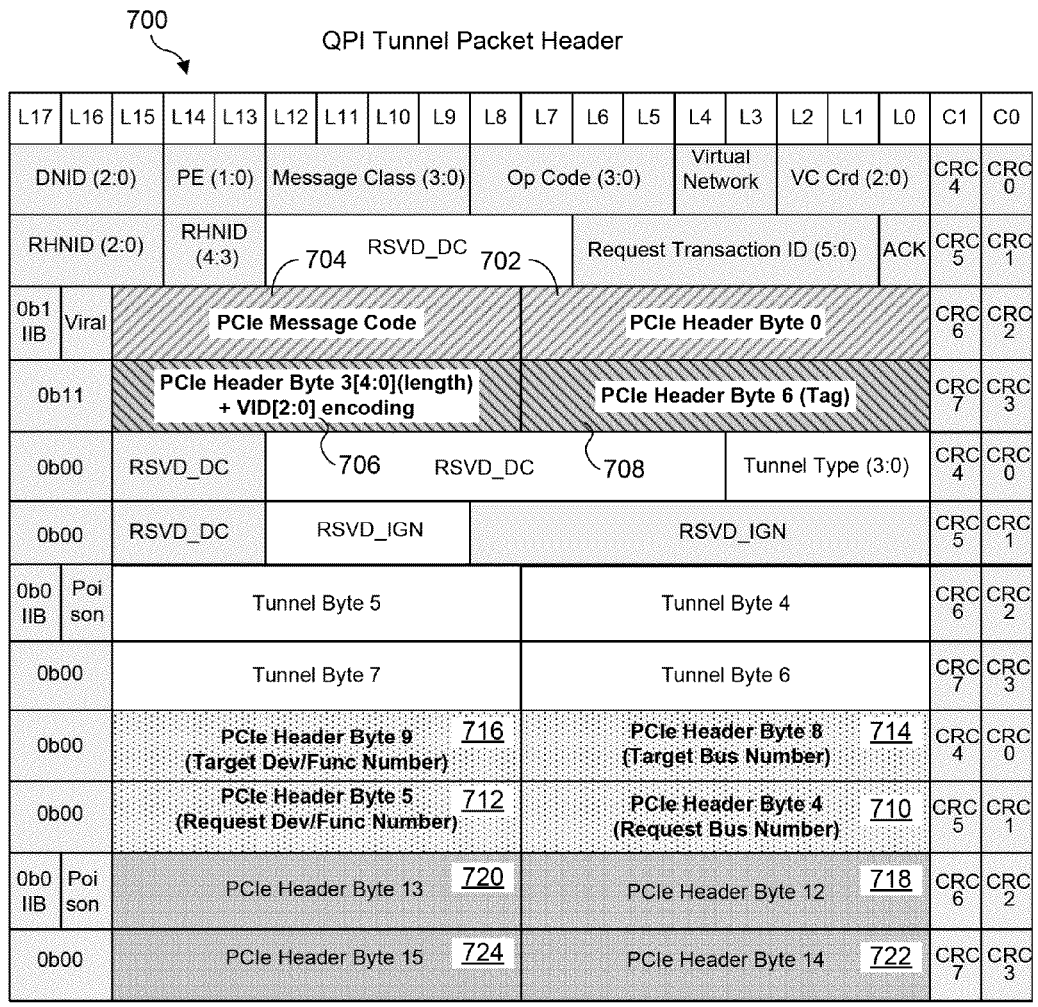
FIG. 7 shows a QPI tunnel packet header and data packet configured to embed content derived from a PCIe VDM message having the format shown in FIG. 6.

An example of packet formats configured to support embedding of an MCTP over PCIe PECI message in a QPI message are shown in FIGS. 6 and 7, wherein crosshatching is used to indicate how fields in the two formats are mapped. In this example, FIG. 6 shows a PCIe VDM message 600 format corresponding to a PECI message, while FIG. 7 shows a QPI tunnel packet header 700 in which data corresponding to selected fields of VDM message 600 are to be embedded. Similar field mappings may be implemented for other types of VDM and/or MCTP message formats.

As discussed above with reference to FIG. 3, QPI employs a link with a width of 20 lanes, wherein each lane carries a respective bit of data to form a 20-bit phit that is transmitted during each QPI clock cycle, and an 80-bit flit is delivered every four QPI clock cycles. As shown in FIG. 7, Lanes L0-L17 are used to carry payload data (in this instance the packet header data is the payload), while lanes C0 and C1 are used for CRC data, with the CRC bits labeled CRC 0-CRC 7. Accordingly, each flit includes 72 bits of payload data and 8 bits of CRC data.

Returning to FIG. 6, data in the fields spanning Byte 0 of message 600 are mapped to a PCIe Header Byte 0 in QPI tunnel packet header 700, while the vendor defined message code of Byte 7 are mapped to a PCIe message code field 704. A combination of bits [4:0] of PCIe header Byte 3 concatenated with bits [2:0] of Byte 11 comprising the Vendor ID code of message 600 is mapped to a PCIe Header Byte 3[4: 0](length)+VID[2:0] encoding field 706, while the PCIe TAG field corresponding to Byte 6 is mapped to a PCIe Header Byte 6 field 708.

Bytes 4 and 5 of message 600 comprises a 16-bit EID of a PCI Requester which in this example corresponds to the legacy ME Bus Device Function (BDF). This is mapped to a PCIe Header Byte 4 field 710 and a PCIe Header Byte 5 field 712. Bytes 8 and 9 of message 600 correspond to a 16-bit EID of a PCI Target device, which in this example is either the BDF for a PCU or a Validation Control Unit (VCU). The 16-bit value in these two fields are mapped to a Header Byte 8 field 714 and a PCIe Header Byte 9 field 716 of QPI tunnel packet header 700. Using a similar field naming scheme, the data in Bytes 12, 13, 14, and 15 of message 600 are respectively mapped to a PCIe Header Byte 12 field 718, a PCIe Header Byte 13 field 720, a PCIe Header Byte 14 field 722, and a PCIe Header Byte 15 field 724.

The remaining data in message 600 corresponding to Bytes 16-24 comprise the PCIe VDM payload data. This data is mapped to a 64 Byte QPI data packet 726 that is appended to QPI tunnel packet header 700 to form a QPI message that is transferred over a socket-to-socket QPI link. Applicable padding is appended to the data for Bytes 16-24 to fill out the 64 Byte QPI data packet, along with applicable CRC data corresponding to the QPI protocol.

It is noted that several fields are not mapped. In message format 600 this includes the fields in Byte 1, and bits [7:2] of Byte 2. The values of these fields are known to both of the PCIe-to-QPI message encapsulation logic and QPI-to-PCIe message extraction logic. Accordingly, these values do not need to be included in the QPI messages, as the corresponding field data can be generated by the QPI-to-PCIe message extraction logic on the receiving end of the tunneled QPI message. In addition, it is further noted that there is no MCTP Transport Header data in a PCIe VDM message format. Accordingly, Bytes 16-19 in the MCTP PCIe message format are shifted up by 4 Bytes in the PCIe VDM message format.

Figure 8:
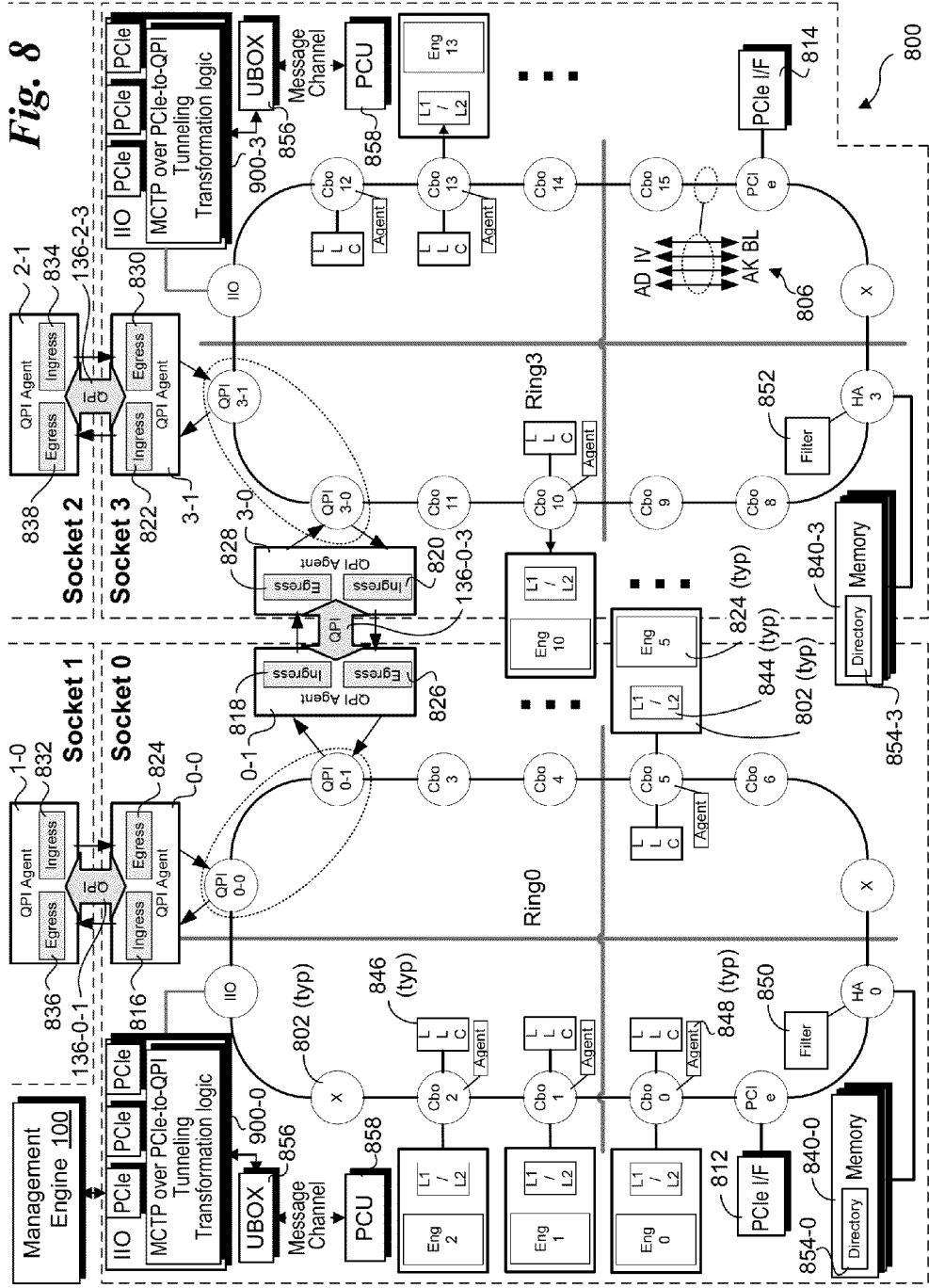
FIG. 8 is a schematic block diagram illustrating selected components of an exemplary processor and platform configuration via which aspects of the embodiments disclosed herein may be implemented.

FIG. 8 shows a system 800 including four sockets and detailing the architecture of processors in Sockets 0 and 3, in accordance with one embodiment. System 800 is illustrative of an advanced system architecture including SoC (System on a Chip) processors (CPU's) supporting multiple processor cores 802, each coupled to a respective node 204 on a ring interconnect, labeled and referred to herein as Ring0 and Ring3 (corresponding to CPU's installed in CPU sockets 0 and 3, respectfully). For simplicity, the nodes for each of the Ring0 and Ring3 interconnects are shown being connected with a single line. As shown in detail 806, in one embodiment each of these ring interconnects include four separate sets of "wires" or electronic paths connecting each node, thus forming four rings for each of Ring0 and Ring3. In actual practice, there are multiple physical electronic paths corresponding to each wire that is illustrated. It will be understood by those skilled in the art that the use of a single line to show connections herein is for simplicity and clarity, as each particular connection may employ one or more electronic paths.

In the context of system 800, data may be routed using independent message classes. Under one embodiment of a ring interconnect architecture, independent message classes may be implemented by employing respective wires for each message class. For example, in the aforementioned embodiment, each of Ring0 and Ring3 include four ring paths or wires, labeled and referred to herein as AD, AK, IV, and BL. Accordingly, since the messages are sent over separate physical interconnect paths, they are independent of one another from a transmission point of view.

In one embodiment, data is passed between nodes in a cyclical manner. For example, for each real or logical clock cycle (which may span one or more real clock cycles), data is advanced from one node to an adjacent node in the ring. In one embodiment, various signals and data may travel in both a clockwise and counterclockwise direction around the ring. In general, the nodes in Ring0 and Ring 3 may comprise buffered or unbuffered nodes. In one embodiment, at least some of the nodes in Ring0 and Ring3 are unbuffered.

Each of Ring0 and Ring3 include a plurality of nodes 804. Each node labeled Cbo n (where n is a number) is a node corresponding to a processor core sharing the same number n (as identified by the core's engine number n). There are also other types of nodes shown in system 800 including QPI nodes 0-0, 0-1, 3-0, and 3-1, IIO nodes, and PCIe nodes. Each of QPI nodes 0-0, 0-1, 3-0, and 3-1 is operatively coupled to a respective QPI Agent 0-0, 0-1, 3-0, and 3-1. The IIO node in Socket 0 is operatively coupled to an IIO block 106, while the IIO node in Socket 3 is operatively coupled to an IIO block 122. The PCIe nodes for Socket 0 and Socket 3 are operatively coupled to PCIe interfaces 812 and 814, respectively. Further shown are a number of nodes marked with an "X"; these nodes are used for timing purposes. It is noted that the QPI, IIO, PCIe and X nodes are merely exemplary of one implementation architecture, whereas other architectures may have more or less of each type of node or none at all. Moreover, other types of nodes (not shown) may also be implemented.

Each of the QPI agents 0-0, 0-1, 3-0, and 3-1 includes circuitry and logic for facilitating transfer of QPI packets between the QPI agents and the QPI nodes they are coupled to. This circuitry includes ingress and egress buffers, which are depicted as ingress buffers 216, 218, 220, and 222, and egress buffers 224, 226, 228, and 230.

System 800 also shows two additional QPI Agents 1-0 and 2-1, each corresponding to QPI nodes on rings of CPU sockets 1 and 2 (both rings and nodes not shown). As before, each QPI agent includes an ingress and egress buffer, shown as ingress buffers 232 and 234, and egress buffers 236 and 238.

The QPI agents 0-0 and 1-0 are configured to facilitate transfer of QPI packets over a socket-to-socket QPI link (aka tunnel, when tunneling MCTP over PCIe packets over QPI) 136-0-1 between Socket 0 and Socket 1. Similarly, QPI agents 0-1 and 3-0 are configured to facilitate transfer of QPI packets over a socket-to-socket QPI link 136-0-3 between Socket 0 and Socket 3, while QPI agents 2-1 and 3-1 are configured to facilitate transfer of QPI packets over a socket-to-socket QPI link 136-2-3 between Socket 2 and Socket 3. In one embodiment there is a similar socket-to-socket QPI link between Socket 1 and Socket 2 (not shown due to lack of drawing space).

In the context of maintaining cache coherence in a multi-processor (or multi-core) environment, various mechanisms are employed to assure that data does not get corrupted. For example, in system 800, each of processor cores 802 corresponding to a given CPU is provided access to a shared memory store associated with that socket, as depicted by memory stores 840-0 or 840-3, which typically will comprise one or more banks of dynamic random access memory (DRAM). For simplicity, the memory interface circuitry for facilitating connection to the shared memory store is not shown; rather, the processor cores in each of Ring0 and Ring3 are shown respectively connected to the memory store via a home agent node 0 (HA 0) and a home agent node 3 (HA 3).

It is also common to have multiple levels of caches, with caches closest to the processor core having the least latency and smallest size, and the caches further away being larger but having more latency. For example, a typical configuration might employ first and second level caches, commonly referred to as L1 and L2 caches. Another common configuration may further employ a third level or L3 cache.

In the context of system 800, the highest level cache is termed the Last Level Cache, or LLC. For example, the LLC for a given core may typically comprise an L3-type cache if L1 and L2 caches are also employed, or an L2-type cache if the only other cache is an L1 cache. Of course, this could be extended to further levels of cache, with the LLC corresponding to the last (i.e., highest) level of cache.

In the illustrated configuration of FIG. 8, each processor core 802 includes a processing engine 842 coupled to an L1 or L1/L2 cache 844, which are "private" to that core. Meanwhile, each processor core is also co-located with a "slice" of a distributed LLC 846, wherein each of the other cores has access to all of the distributed slices. Under one embodiment, the distributed LLC is physically distributed among N cores using N blocks divided by corresponding address ranges. Under this distribution scheme, all N cores communicate with all N LLC slices, using an address hash to find the "home" slice for any given address. Suitable interconnect circuitry is employed for facilitating communication between the cores and the slices; however, such circuitry is not show in FIG. 8 for simplicity and clarity.

As further illustrated, each of nodes 804 in system 800 is associated with a cache agent 848, which is configured to perform messaging relating to signal and data initiation and reception in connection with a coherent cache protocol implemented by the system, wherein each cache agent 848 handles cache-related operations corresponding to addresses mapped to its collocated LLC 846. In addition, in one embodiment each of home agents HA0 and HA3 employ respective cache filters 850 and 852, and the various caching and home agents access and update cache line usage data stored in a respective directory 854-0 and 854-3 that is implemented in a portion of shared memory 840-0 and 840-3. It will be recognized by those skilled in the art that other techniques may be used for maintaining information pertaining to cache line usage.

In accordance with one embodiment, a single QPI node may be implemented to interface to a pair of CPU socket-to-socket QPI links to facilitate a pair of QPI links to adjacent sockets. This is logically shown in FIG. 8 by dashed ellipses that encompass a pair of QPI nodes within the same socket, indicating that the pair of nodes may be implemented as a single node. For instance, QPI nodes 0-0 and 0-1 may comprise a single node. In addition, the QPI agents include routing logic that enables QPI packets to be routed between processors that are not directly connected via a socket-to-socket QPI link, wherein packets arriving at a QPI node over a first socket-to-socket QPI link and destined for another processor are routed to a second socket-to-socket QPI link without being placed on a ring.

In one embodiment, Ring0 and Ring3 are implemented using QPI interconnect segments and the QPI protocol. During each QPI clock cycle, QPI packet data are transferred across QPI segments between nodes using multiple physical interconnects and in both clockwise and counterclockwise directions. During each segment transfer sequence, there is a pause cycle after the data arrives at each node, during which the data at a given node may be buffered if it is destined for an agent attached to the node, or data buffered by an agent awaiting to be transferred to the ring may be added if there is no arriving data on a given interconnect segment (referred to as an empty packet). Accordingly, the nodes are referred to as ring stops or ring stop nodes.

QPI packets are routed via corresponding logical addresses for destination agents coupled to the nodes. During each pause cycle, a packet is inspected by the agent or agents attached to the node to determine whether the packet is destined for that agent. If it is, then the packet is "taken off the ring" and buffered by the agent. If it is not, the packet data is forwarded to the next ring stop during the next transfer cycle.

Putting a packet onto the ring employs a similar, albeit reverse, process. Packets to be put onto the ring are buffered by an agent, which detects if a packet corresponding to a current pause cycle for an interconnect segment (or message class) applicable to the buffered packet is an empty packet. If so, the buffered packet data is added at the node and made available for transfer to an adjacent node during the next transfer cycle. If the packet arriving at the node for the interconnect segment of message class is not empty then it is merely forward on during the next transfer cycle, and no packet data is added to the ring at the node during the current cycle.

Returning to the QPI routing aspect, QPI employs the use of a virtual networking scheme employing associated logical addressing and message class identifiers. QPI employs various node identifies in packet headers use for routing, including an ID for a destination node (DNID). QPI also employs routing information from which the destination Ring can be identified. The QPI agents coupled to the QPI nodes maintain routing information that an agent uses to determine whether a packet is destined for another ring, and thus requires transfer across a socket-to-socket QPI link associated with the QPI agent. This functionality is used to route traffic between sockets (i.e., between processors) using socket-to-socket QPI links.

Typically, the majority of QPI messages that are transferred during processor operations comprise coherent messages that are employed for maintaining cache coherency. These messages are implemented using coherent message classes and employ addressing schemes for facilitating coherent memory transactions. QPI also supports use of non-coherent messages (and an associated non-coherent message class). In one embodiment, the QPI messages used for QPI tunneling comprise non-coherent messages.

The processors in Socket 0 and Socket 3 include a respective IIO block 900-0 and 900-3 coupled to a respective IIO node. Each of IIO blocks 900-0 and 900-3 is also coupled to a Utility Box (UBOX) 856, which in turn is coupled in communication with a PCU 858 over a message channel. The UBOX is used on a processor for routing various messages between processor components, such as between a PCU and an IIO block.

Figure 9:
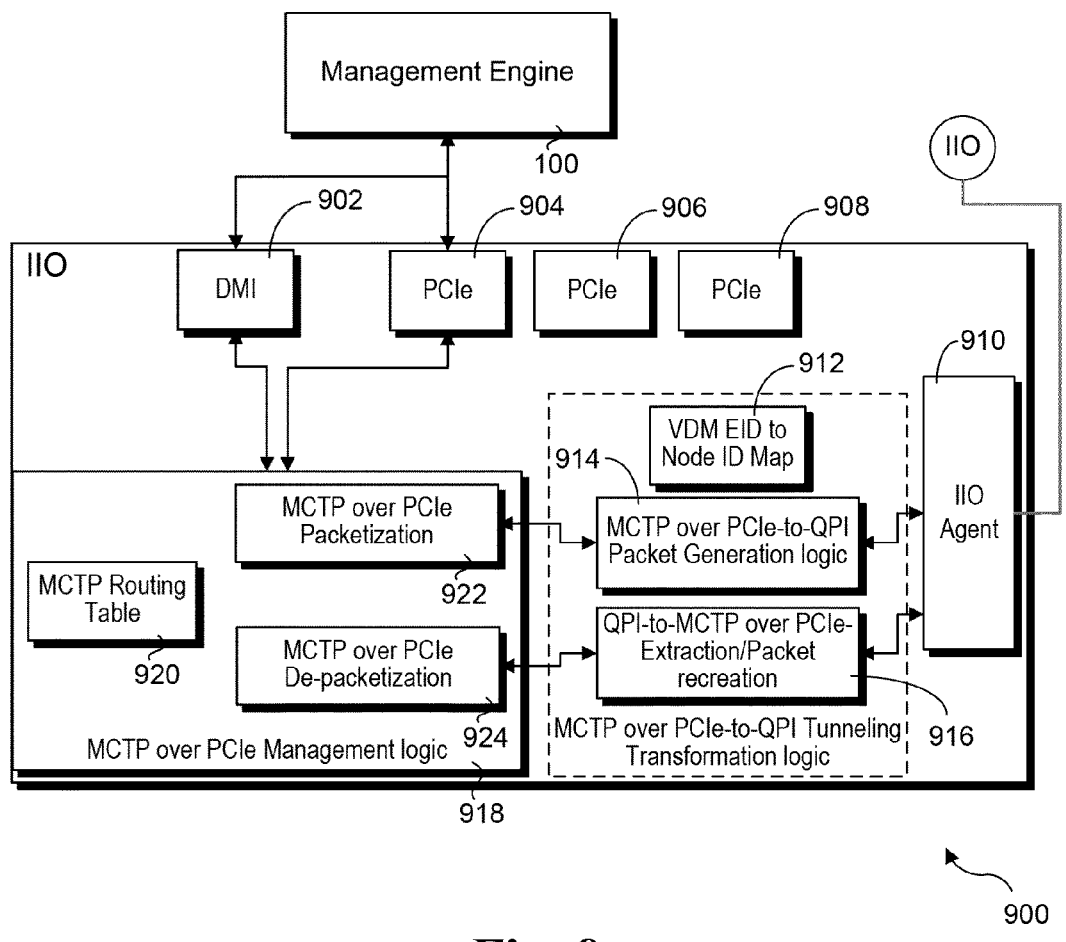
FIG. 9 is a block diagram illustrating management logic for implementing packet routing, tunneling, extraction, and recreation, according to one embodiment.

FIG. 9 shows further details of an IIO block 900, according to one embodiment. The blocks and routing shown in FIG. 9 is simplified in order to focus on the MCTP over PCIe-to-QPI tunneling aspects. In addition to the blocks shown in FIG. 9, a typical IIO block includes additional functional blocks, logic and routing.

The blocks for IIO block 900 include a DMI block 902 and three PCIe blocks 904, 906, and 908. Communication with a Ring is handled by an IIO agent 910, which is depicted as being coupled to an IIO node. A portion of logic comprising MCTP over PCIe-to-QPI tunneling transformation logic includes a VDM EID to Node ID map 912, an MCTP over PCIe-to-QPI packet generation block 914, and a QPI-to-MCTP over PCIe extraction/packet recreation block 916. IIO block 900 also includes MCTP over PCIe management logic 918 comprising an MCTP routing table 920, an MCTP over PCIe packetization block 922, and an MCTP over PCIe de-packetization block 924.

Figure 10:
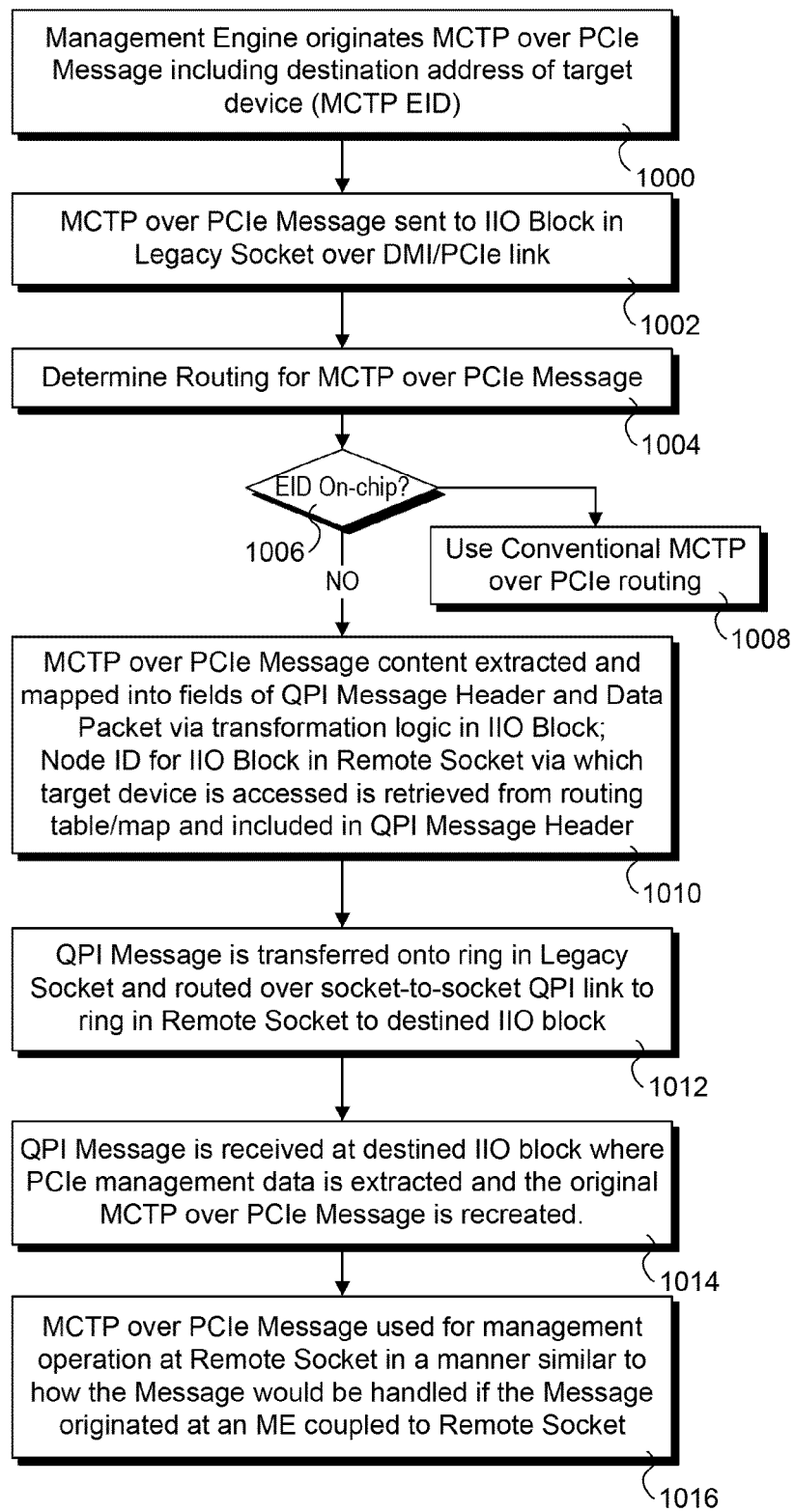
FIG. 10 is a flowchart illustrating operations and logic for performing platform management operations associated with manageable devices operatively coupled to multiple processors using a single management entity and management message tunneling, according to one embodiment.

FIG. 10 is a flowchart depicting logic and operations for effecting transfer of MTCP over PCIe messages via QPI tunneling using aspects of the embodiments disclosed herein. With reference to FIG. 10 and FIGS. 8 and 9, the process begins in a block 1000 in which a management engine originates an MTCP over PCIe message including the destination address of the target device to which the message is to be delivered. Target devices are also referred to herein as a destined manageable device. Under MTCP, the destination address of the target device is the EID of the target device. The operation in PCIe is typical of a conventional MCTP over PCIe message request issued from an ME. Accordingly, in a block 1002, the MCTP over PCIe message is sent over a DMI or PCIe link to the IIO block to which the management engine is coupled (e.g., the Legacy Socket in accordance with the embodiment shown in FIG. 1 or the IIO block 900-0 in Socket 0 in accordance with the embodiment shown in FIG. 8, both of which are also referred to as the local socket or processor).

As per conventional MCTP over PCIe message handling, routing for the packet is performed to determine where the packet is to be routed, as shown in a block 1004. Under conventional MCTP over PCIe message routing, all destined manageable devices are accessible via the processor to which the ME is coupled. However, the embodiments herein support routing MCTP over PCIe messages to manageable devices that are connected to other processors in the platform using QPI tunneling. Accordingly, there is logic in MCTP routing table 920 or another component (not shown) that determines whether the message is to be routed to another processor over a socket-to-socket QPI tunnel, as depicted by a decision block 1006.

If the routing is on-chip (meaning a route to the target device can be made from the local processor), the message is routed in the conventional manner using MCTP over PCIe management logic 918, as shown in a block 1008. However, if the routing is off-chip (meaning the routing requires traversal of at least one socket-to-socket QPI tunnel), further operations are performed to facilitate QPI tunneling.

These begin at a block 1010, wherein selected portions (e.g., data in selected fields) of the MCTP over PCIe Message content is extracted and mapped into fields of a QPI message header and data packet(s) via tunneling transformation logic in the IIO block, e.g., via MCTP over PCIe-to-QPI packet generation block 914. Since QPI packets are routed via Node IDs (and not EIDs), the node of the IIO block via which the target device is to be accessed is also determined, and corresponding address information is added to the QPI packet header. In the illustrated embodiment, information for mapping between EIDs and Node IDs is provided via VDM EID to Node ID map 912.

At this point, the QPI tunnel packet header and data payload packet(s) are generated and ready for transfer to the appropriate destination IIO block via one or more socket-to-socket QPI tunnels. The packet data is forwarded to IIO agent 910, where it is buffered waiting to be placed on the ring of the local processor. The QPI tunnel message is then put on the local processor ring and routed over one or more socket-to-socket QPI tunnels to the destined IIO block, as depicted in a block 1012.

Suppose that a QPI tunnel packet is to be routed from IIO block 900-0 on Socket 0 to IIO block 900-3 on Socket 3. The packet would be put on Ring0 at the IIO node and routed clockwise around the ring to QPI node 0-1, where it is routed over socket-to-socket QPI Link [ ] to QPI node 3-0 via operations facilitated by QPI agents 0-1 and 2-0. Once on Ring3, the packet is routed clockwise to the IIO, where it is accessed by IIO block 900-3.

Once received at the destined (remote) IIO block, logic in IIO agent 910 determines whether the packet is a QPI tunnel packet. If so, the packet is forwarded to QPI-to-MCTP over PCIe extraction/packet recreation block 916, wherein the MCTP over PCIe field data embedded in the QPI tunnel packet header and payload is extracted, and the original MCPT over PCIe packet is recreated, as shown in a block 1014. The recreated MCTP over PCIe message is then forwarded to MCTP over PCIe management logic 918, where it is handled in a manner similar to as if it was received from a management engine coupled to the destined IIO block, as shown in a block 1016. For example, depending on the particular target device or type of message the packet might be routed to the target device via one of PCIe blocks 904, 906, or 908, via DMI block 902, or via another IO block (not shown).

Alternatively, full or partial de-packetizing could be performed by MCTP over PCIe de-packetization block 924.

The techniques and embodiments disclosed herein provide significant advantages over conventional approaches used for platform management. For example, in accordance with teachings herein, a single management entity such as an ME or BMC can be used to access manageable devices operatively coupled to multiple processors in a multi-processor platform. Accordingly, the ME is no longer limited to being able to only access manageable devices operatively coupled to the processor it is coupled to. In addition, the use of QPI tunneling and QPI interconnect structures and protocols supports very-high bandwidth message transfers, such that the relative latency resulting from management message transfers between management logic in separate processors is substantially insignificant. The net result is the management messaging performance level is similar to as if an ME was connected directly to each processor.

In addition enabling a management entity to delivery management messages to managed devices that are external to processors (such as, but not limited to PCIe devices), the management entity is also enabled to access manageable components with the processors, again as if a management entity was directly connected to each processor. Moreover, the techniques disclosed herein are scalable, providing support for new and future processor architectures employing a large number of cores.

Although illustrated in the context of processors employing ring interconnect architectures, processors employing other interconnect architectures, such as 2D mesh fabric interconnect structures, may also be used.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein, the terms logic, block, and component, when used in the context of a processor, may be used interchangeably. For example, management logic, a management block, or a management component may all refer to the same element or entity in a processor. The term logic also generally encompasses any form of embedded circuitry and, optionally, any firmware or microcode that may be implemented by the embedded circuitry for performing corresponding operations implemented by the logic. For example, logic may comprise embedded programmable logic circuitry, or an embedded processor, microcontroller, or the like that executes firmware or microcode to facilitate embedded logic functionality. Under terminology known to those skilled in the art, logic as used herein also may be referred to as a block, a functional block, and IP (Intellectual Property) block (or simply an IP), embedded logic, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
   in a platform including a plurality of processors,
      facilitating communication of platform management messages between management logic in the plurality of processors to enable management of components embedded in and/or devices operatively coupled to the plurality of processors via a management entity coupled to a first processor of the plurality of processors; and
      employing mapping information that maps address information for target devices to which platform management messages may be sent to address information corresponding to components via which the target devices may be accessed.

2. The method of claim 1, wherein the management messages comprise Peripheral Component Interconnect Express (PCIe) management messages.

3. The method of claim 2, wherein PCIe comprises a first interconnect protocol, the method further comprising tunneling PCIe management messages between processors using a second interconnect protocol.

4. The method of claim 3, wherein the PCIe management messages are tunneled between processors using QuickPath Interconnect (QPI) tunnel messages sent between processors over at least one socket-to-socket QPI link.

5. The method of claim 4, wherein at least one PCIe management message is routed from the first processor to a third processor via a second processor using a first socket-to-socket QPI link coupled between the first and the second processors, and a second socket-to-socket QPI link coupled between the second processor and the third processor.

6. The method of claim 2, wherein the PCIe management messages comprise Management Component Transport Protocol (MCTP) over PCIe messages.

7. The method of claim 1, wherein first management logic is embedded in a first Input/Output (IO) block in a first processor and second management logic is embedded in a second IO block in a second processor, the method further comprising transferring a platform management message from the first IO block to the second IO block by performing operations including,
  routing the platform management message along a portion of a first ring interconnect in the first processor from a first node communicatively coupled to the first IO block to second node on the first ring interconnect;
  routing the platform management message from the second node to a third node on second ring interconnect of a second processor via a socket-to-socket interconnect link; and
  routing the platform management message along a portion of the second ring interconnect from the third node to a fourth node communicatively coupled to the IO block.

8. A method comprising:
  in a platform including a plurality of processors, facilitating communication of platform management messages between management logic in the plurality of processors to enable management of components embedded in and/or devices operatively coupled to the plurality of processors via a management engine coupled to a first processor of the plurality of processors.

9. The method of claim 8, further comprising employing mapping information that maps address information for target devices to which platform management messages may be sent to address information corresponding to components via which the target devices may be accessed.

10. An apparatus comprising:
  logic configured to generate a first interconnect tunnel message in which data corresponding to a first PCIe management message is embedded;
  logic configured to receive a second interconnect tunnel message in which data corresponding to a second PCIe management message is embedded and recreate the second PCIe management message;
  a first interface configured to facilitate communication with a management entity communicatively coupled to the apparatus during operation of the apparatus; and
  a second interface configured to be communicatively coupled to a node on a ring interconnect of a processor.

11. The apparatus of claim 10, wherein the PCIe management messages comprises an MCTP over PCIe management message.

12. The apparatus of claim 10, wherein the tunnel message comprises a QuickPath Interconnect (QPI) tunnel message.

13. The apparatus of claim 10, wherein the apparatus comprises a functional block on a processor.

14. A computing platform, comprising:
  a plurality of manageable devices;
  a plurality of processors including a first processor and a second processor coupled in communication via a first socket-to-socket interconnect, each processor including management logic and operatively coupled to at least one manageable device; and
  a management entity, coupled in communication with the first processor,
  wherein the first processor is configured to receive a first management message from the management entity, and employ its management logic to encapsulate management message content derived from the first management message in a first tunnel message that is tunneled over the first socket-to-socket interconnect to the management logic in the second processor, and wherein management logic in the second processor is configured to extract the management message content from the first tunnel message, recreate the first management message, and employ the recreated first management message to perform a management operation associated with a device that is operatively coupled to the second processor.

15. The computing platform of claim 14, wherein the management messages comprise Peripheral Component Interconnect Express (PCIe) management messages, and wherein the manageable devices comprise PCIe devices.

16. The computing platform of claim 14, wherein first socket-to-socket interconnect comprise a QuickPath Interconnect (QPI) socket-to-socket link, and the tunnel message comprises a QPI tunnel message.

17. The computing platform of claim 14, further comprising:
  a third processor; and
  a second socket-to-socket interconnect between the second and third processors,
  wherein the first, second, and third processors are configured to facilitate routing of tunnel messages to enable a second tunnel message generated by the management logic in the first processor to be routed to management logic in the third processor by tunneling the second tunnel message over the first socket-to-socket interconnect and the second socket-to-socket interconnect.

18. The computing platform of claim 14, wherein the management messages comprise Management Component Transport Protocol (MCTP) over PCIe messages.

19. The computing platform of claim 14, wherein the management entity comprises a Management Engine (ME).

20. The computing platform of claim 14, wherein the management entity comprises a Baseboard Management Controller (BMC).

21. The computing platform of claim 14, wherein first management logic is embedded in a first Input-Output (IO) block in the first processor and second management logic is embedded in a second IO block in the second processor, and wherein the first and second processors are configured to transfer a management message from the first IO block to the second IO block by performing operations including,
  routing the management message along a portion of a first ring interconnect in the first processor from a first node communicatively coupled to the first IO block to second node on the first ring interconnect;
  routing the platform management message from the second node to a third node on a second ring interconnect of a second processor via a socket-to-socket interconnect link; and
  routing the platform management message along a portion of the second ring interconnect from the third node to a fourth node communicatively coupled to the IO block.

22. The computing platform of claim 14, wherein the first processor is configured to employ mapping information that maps address information for each manageable devices to which management messages may be sent to address information corresponding to a ring interconnect node corresponding to an IO block employed for communicating with the manageable device.

* * * * *